Nov. 27, 1945.   R. H. MITCHELL   2,389,993
DISK GANG ASSEMBLY
Filed July 9, 1943
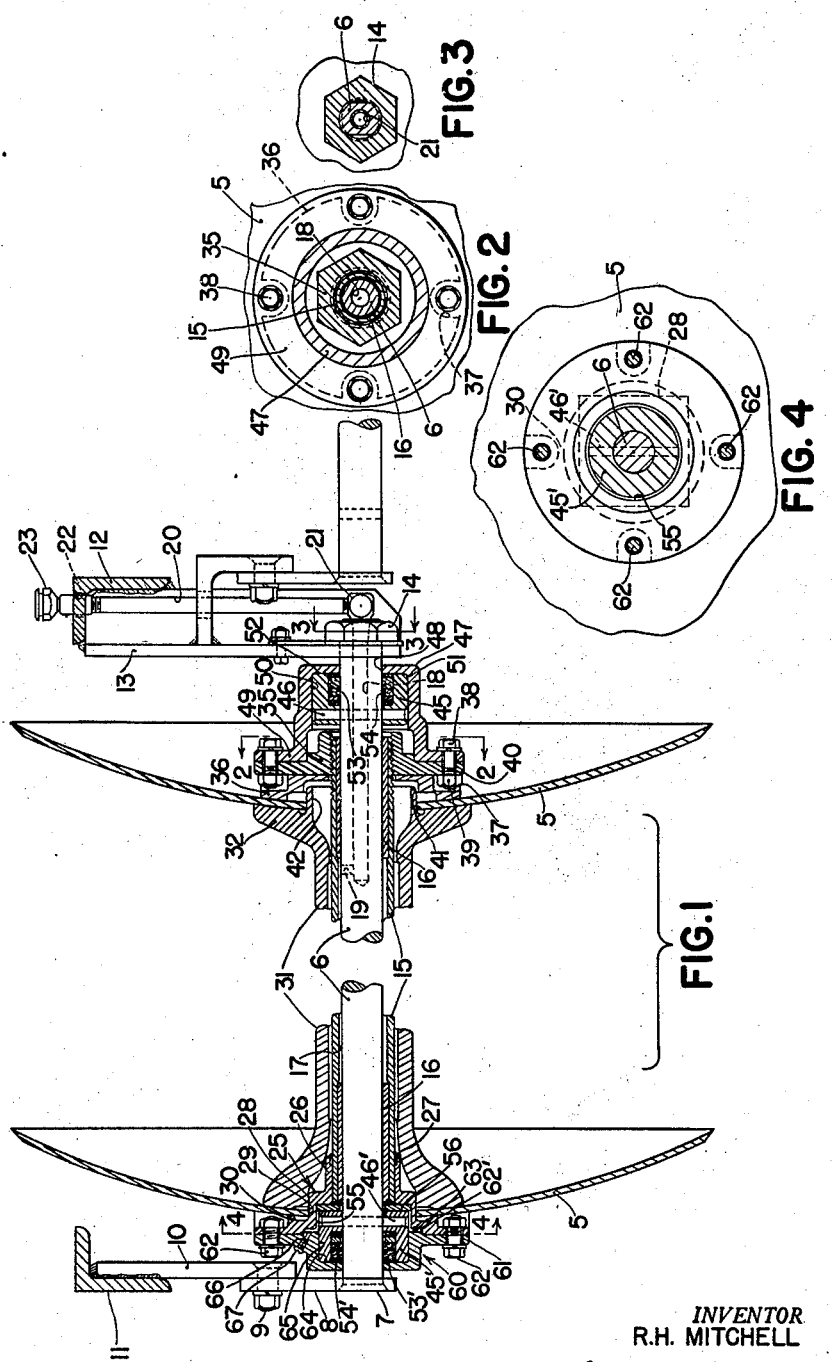
INVENTOR
R.H. MITCHELL
ATTORNEYS Patented Nov. 27, 1945

2,389,993

UNITED STATES PATENT OFFICE 2,389,993

DISK GANG ASSEMBLY

Rollie H. Mitchell, Huntington Park, Calif., assignor to Killefer Manufacturing Corporation, Los Angeles, Calif., a corporation of California Application July 9, 1943, Serial No. 494,102

20 Claims. (Cl. 97—220)

The present invention relates generally to disk gang assemblies and more particularly to the means for mounting disk blades in the frame of a disk harrow or other implement, and has for its principal object the provision of an improved form of mounting for ground working disks on a fixed axle or shaft secured to the implement frame. More particularly, it is an object of the present invention to provide a mounting for ground working disks on a rotatable tube journaled on a fixed axle, the ends of the tube being sealed to provide a lubricant containing, dust-proof housing which is of simple construction and permits exceptionally free rotation of the ground working disks.

This invention is in the nature of an improvement over the disk gang assembly disclosed in Patent 2,272,100, granted February 3, 1942, to Thomas, Wadelton and Sjogren. This patent discloses a disk gang in which the disks are mounted on a tube journaled on a fixed axle, the axle having a collar fixed thereto and the tube having a thrust bearing attached at one end thereof and embracing the collar, with bearing surfaces against the opposite faces of the collar in order to not only resist the thrust of the disks during operation but also to prevent axial movement of the tube and disks in the direction opposite to that of the normal thrust.

A specific object of the present invention relates to the provision of a bearing at one end of the tube, which is a combined thrust and radial load carrying bearing, having a longer life and greater durability and also being more resistant to shocks, while at the same time maintaining a simplicity of design without sacrifice of durability to exclude dirt and foreign matter while retaining the lubricant within the bearing and within the supporting tube.

A further object relates to the provision of a bearing closely adjacent the support at the end of the stationary shaft, thereby reducing deflection therein and producing a stronger structure.

These and other objects and advantages of this invention will be apparent after a consideration of the following description, in which reference is had to the drawing appended hereto, in which Figure 1 is a sectional elevation taken along a center line of a disk harrow gang, embodying the principles of the invention and showing the bearing construction at each end of the gang assembly, the center portion being broken away for purposes of simplification;

Figure 2 is a sectional end view taken along a line 2—2 of Figure 1;

Figure 3 is a sectional end view taken along a line 3—3 in Figure 1; and

Figure 4 is an end view taken substantially along a line 4—4 in Figure 1.

Referring now to the drawing, the disk gang assembly comprises a plurality of ground working disks 5 of the conventional concavo-convex type, rigidly assembled together in a unitary structure and rotatably journaled on a relatively stationary axle 6 which is rigidly secured, as by welding, indicated at 7, to a supporting arm 8 at one end of the axle, the arm 8 being fixed by a bolt 9 to a bracket 10 depending from the frame member 11 of the harrow gang frame. The opposite end of the axle is supported on another frame angle 12, from which depends a supporting member 13 which is apertured to receive the end of the axle 6, the latter being provided with a large retaining nut 14 threaded on the end thereof. The frame of the harrow including the members 11, 12 is not shown in detail, inasmuch as any suitable frame can be used and the details thereof are not important in the present disclosure.

The axle 6 is enclosed, except at its ends, in a tube 15, the opposite ends of which are journaled on the axle 6 by means of suitable bearing sleeves 16, pressed tightly into the ends of the tube 15. The sleeves 16 are preferably of bronze or other suitable bearing material. The tube 15 is constructed with an internal diameter appreciably larger than the outside diameter of the axle 6 and thus providing a space 17 therebetween, which not only serves to accommodate the bearing sleeves 16 but provides a lubricant-retaining reservoir between the two bearing sleeves 16, into which space lubricant is supplied through a bore 18, extending axially at one end of the axle 6 and communicating with the reservoir 17 by means of a passage 19. A lubricant supply pipe 20 is threaded at one end into a fitting 21, which is threaded into an axial opening within the nut 14, and extends vertically through a hole 22 in the frame member 12 and is provided at its upper end with a lubricant fitting 23 through which lubricant can be supplied to fill the reservoir 17.

Fixed at the left-hand end of the tube 15 as viewed in Figure 1, is a generally circular bracket member 25 having a sleeve portion 26 which fits over the end of the tube 15 and is fixed thereto as by welding, indicated at 27, to prevent the bracket 25 from rotating relative to the tube. The bracket 25 is provided with an enlarged portion 28 of square cross section, which is adapted to receive the square aperture 29 in the end disk 5, and is further provided with a flange portion 30, which forms an abutment for the convex side of the end disk 5. The latter is held against the flange 30 by means of a spacing spool 31, which encircles the tube 15 and is provided at its opposite end with a flange 32 forming the abutment for the next disk 5. The spool 31 is broken away at the center to indicate that any number of disks with their respective spacing spools can be interposed between the two end disks, as is well-known to those skilled in the art. The assembly of disks and spools is rigidly clamped against the bracket flange 30 by means of a gang nut 35, which is threaded on the opposite end of the tube 15 and bears against a gang washer 36, which abuts the concave side of the disk 5 at that end of the assembly. The washer 36 is provided with a plurality of recesses 37 which receive the ends of bolts 38 and nuts 39 threaded thereon, the bolts 38 being disposed within suitable apertures in a flange 40 extending radially from the nut 35. The washer 36 is provided with an internal recess 41 of square cross section adapted to receive a cooperative square end flange 42 on the spool 32, preventing the washer 36 from turning on the tube 15, and in turn preventing the nut 35 from turning on its threads by virtue of the bolts 38 and nuts 39 projecting into the recesses 37, whereby the entire assembly is interlocked to prevent any portion thereof from rotation relative to the remainder of the assembly.

A bearing member in the form of a collar 45 is fixed on the right-hand end of the shaft 6 by means of a securing pin 46 extending diametrically through aligned openings in the collar 45 and shaft 6, respectively. A closure member or sealing cap 47 is provided with an aperture 48 through which the shaft 6 extends, the cap 47 embracing and enclosing the collar 45, and is provided with a flange 49 disposed in abutment with the flange 40 of the nut 35, and is secured thereto by the bolts 38. The cap 47 has an internal bearing surface 50 which is journaled on the peripheral surface 51 of the cylindrical collar 45. The end wall of the cap 47 is adapted to bear against the outer face 52 of the collar 45, and may resist the end thrust of the disks, although most of this end thrust is resisted by a thrust member at the opposite end of the shaft, as will be later explained. The collar 45 is provided with an annular recess 53 in the outer radial face 52 about the axle 6. The recess 53 is provided with an annular resilient lubricant sealing member 54 which bears against the inner radial surface of the end wall of the cap 47 and prevents lubricant from escaping through the opening 48 and also prevents dirt from entering the bearing.

At the opposite end of the axle 6, a similar bearing member or thrust collar 45' is fixed by a pin 46' and is adapted to be received within a circular recess 55 in the end of the bracket 25. A wear plate 56 is apertured to fit over the shaft 6 and is disposed within the recess 55 between the thrust collar 45' and the end of the recess 55 in the bracket 25. Thus, the end thrust of the disks 5 is transmitted through the bracket 25 and the wear plate 56 to the inner radially extending face of the thrust collar 45', which, being rigidly fixed to the axle 6, resists the thrust force and prevents axial movement of the disk assembly toward the left as viewed in Figure 1.

The disk assembly is prevented from moving axially along the axle 6 to the right, and is thus prevented from rubbing against the supporting member 13 at the right-hand end, by means of a second closure or bracket member 60, which is cup-shaped to receive the thrust collar 45' and is provided with a radially outwardly extending flange 61, rigidly attached by bolts 62 to the outer portion of the flange 30 on the end bracket 25. The cup-shaped bracket 60 is provided with an annular ridge 62', which fits into a recess 63 in the flange portion 30, to center the bracket 60 relative to the axle 6. The inner radially extending surface 64 of the end wall of the cup-shaped bracket 60 is adapted to bear against the outer face of the cylindrical thrust collar 45' to prevent the disk assembly from movement toward the right on the axle 6. The cylindrical inner surface 65 of the cup-shaped bracket 60 is journaled on the peripheral surface of the thrust collar 45' and serves as a radial load supporting bearing for the disk gang assembly. Thus, it will be evident that the thrust collar 45' and the brackets 25 and 60 rigidly fixed together by the bolts 62, constitute a combined thrust and radial bearing of simple and inexpensive construction. Although some lubricant will undoubtedly feed into this bearing from the reservoir 17 through the sleeve bearing 16, additional lubricant can be supplied through a passage 66 in the end bracket 60, the passage 66 being sealed during operation by a bolt 67. The lubricant is prevented from escaping between the bracket 60 and the shaft 6 by an annular resilient sealing member 54' disposed within an annular recess 53' in the outer radial face of the thrust collar 45', substantially as described hereinabove. The sealing member 54' bears against the radial end wall 64 of the bracket 60 and serves to exclude dirt from the bearing as well as preventing escape of the lubricant within the bearing.

I claim:

1. In a disk gang including a frame and an axle rigidly mounted thereon, the combination of a tube disposed coaxially on said axle, a plurality of ground working disks mounted on said tube, a cylindrical thrust collar rigidly fixed on said axle, means on said tube bearing on one side of said collar to transmit the thrust force of said disks to the collar, means fixed relative to said tube and rotatable therewith, bearing against the opposite side of said collar to resist axial movement of said tube in the opposite direction, and means fixed relative to said tube and rotatable therewith, journaled on the peripheral surface of said collar and adapted to transmit a substantial portion of the radial load thereto.

2. In a disk gang including a frame and an axle rigidly mounted thereon, the combination of a tube disposed axially on said axle, a plurality of ground working disks mounted on said tube, a cylindrical thrust collar rigidly fixed on said axle, and a combined radial and thrust bearing fixed relative to said tube and rotatable therewith, having a bearing surface journaled on the peripheral surface of said collar and a pair of opposed thrust bearing surfaces engaging the opposite faces of said collar, respectively.

3. In a disk gang including a frame and an axle rigidly mounted thereon, the combination of a tube disposed axially on said axle, a plurality of ground working disks mounted on said tube, a cylindrical thrust collar rigidly fixed on said axle at one end of said tube, a bracket fixed to one end of said tube and bearing on the inner face of said collar to transmit the thrust force of said disks to the axle, a bracket detachably fixed relative to said tube and rotatable therewith, bearing against the outer face of said collar to resist axial movement of said tube in the opposite direction, and a bearing surface on one of said brackets journaled on the peripheral surface of said collar.

4. In a disk gang including a frame and an axle rigidly mounted thereon, the combination of a tube disposed coaxially on said axle, a plurality of ground working disks mounted on said tube, a cylindrical thrust collar rigidly fixed on said axle and a combined radial and thrust bearing comprising a pair of brackets detachably fixed together embracing the two faces of said collar and rotatable relative thereto, a bearing surface on at least one of said brackets journaled on the peripheral surface of said collar, and means for rigidly securing said brackets to the end of said tube.

5. In a disk gang including a frame and an axle rigidly mounted thereon, the combination of a tube disposed coaxially on said axle, a plurality of ground working disks mounted on said tube, a cylindrical thrust collar rigidly fixed on said axle, a first bracket fixed on one end of said tube and adapted to bear against the inner face of said collar to transmit thrust force thereagainst, means engaging the opposite end of said tube for rigidly clamping said disks against said bracket, a second bracket detachably fixed to said first bracket and embracing said axle on the outer side of said collar and having a bearing surface adapted to bear against the outer face of the collar to restrain said tube from axial movement away from said collar, and a bearing surface on one of said brackets journaled on the peripheral surface of said collar.

6. In a disk gang including a frame and an axle rigidly mounted thereon, the combination of a tube disposed coaxially on said axle, a plurality of ground working disks mounted on said tube, a cylindrical thrust collar rigidly fixed on said axle at one end of said tube, a first bracket fixed to one end of said tube and bearing on the inner face of said collar to transmit the thrust force of said disks to the axle, a second bracket detachably fixed to said first bracket and bearing against the outer face of said collar to resist axial movement of said tube in the opposite direction, and a bearing surface within said second bracket journaled on the peripheral surface of said collar.

7. In a disk gang including a frame and an axle rigidly mounted thereon, the combination of a tube disposed coaxially on said axle, a plurality of ground working disks mounted on said tube, a cylindrical thrust collar rigidly fixed on said axle, a first bracket fixed on one end of said tube and adapted to bear against the inner face of said collar to transmit thrust force thereagainst, means engaging the opposite end of said tube for rigidly clamping said disks against said bracket, a second bracket detachably fixed to said first bracket and embracing said axle on the outer side of said collar, said second bracket having one bearing surface adapted to bear against the outer face of said collar and a second bearing surface journaled on the peripheral surface of said collar.

8. In a disk gang including a frame and an axle rigidly mounted thereon, the combination of a tube disposed coaxially on said axle, a plurality of ground working disks mounted on said tube, a cylindrical thrust collar rigidly fixed on said axle, a first bracket fixed on one end of said tube and adapted to bear against the inner face of said collar to transmit thrust force thereagainst, means engaging the opposite end of said tube for rigidly clamping said disks against said bracket, a second bracket detachably fixed to said first bracket and embracing said axle on the outer side of said collar and having a bearing surface adapted to bear against the outer face of the latter to restrain said tube from axial movement away from said collar, and a bearing surface on one of said brackets journaled on the peripheral surface of said collar, said cylindrical collar having an annular recess in the outer face thereof and resilient sealing means within said recess engaging said bearing surface on said second bracket, and means for introducing lubricant to said bearing surfaces.

9. In a disk gang including a frame and an axle rigidly mounted thereon, the combination of a tube disposed coaxially on said axle, a plurality of ground working disks mounted on said tube, a cylindrical thrust collar rigidly fixed on said axle, a first bracket fixed on one end of said tube and adapted to bear against the inner face of said collar to transmit thrust force thereagainst, means engaging the opposite end of said tube for rigidly clamping said disks against said bracket, a second bracket detachably fixed to said first bracket and embracing said axle on the outer side of said collar, said second bracket being cup-shaped and having an inner cylindrical bearing surface journaled on the peripheral surface of said collar, a radially disposed bearing surface adapted to bear against the outer face of said collar, and a radially extending flange for attaching said second bracket to said first bracket.

10. In a disk gang including a frame and an axle rigidly mounted thereon, the combination of a tube disposed coaxially around said axle, a plurality of ground working disks mounted on said tube, a cylindrical collar fixedly disposed on said axle beyond an end of said tube, and a bearing bracket detachably fixed relative to said tube and rotatable therewith, journaled on said cylindrical collar.

11. In a disk gang including a frame and an axle rigidly mounted thereon, the combination of a tube disposed coaxially around said axle, a plurality of ground working disks mounted on said tube, a cylindrical collar fixedly disposed on said axle beyond an end of said tube, a first bracket fixedly mounted on an end of said tube, means cooperating with said bracket for clamping said disks on said tube, and a bearing bracket detachably fixed to said clamping bracket and having an axially extending portion embracing said collar and journaled on the cylindrical surface of the latter.

12. In a disk gang including a frame and an axle rigidly mounted thereon, the combination of a tube disposed coaxially around said axle, a plurality of ground working disks mounted on said tube, a cylindrical collar fixedly disposed on said axle beyond an end of said tube and having a diameter greater than the diameter of said tube, and a cup-shaped bearing bracket detachably fixed relative to said tube and rotatable therewith, having an inner cylindrical surface journaled on said cylindrical collar.

13. In a disk gang including a frame and an axle rigidly mounted thereon, the combination of a tube disposed coaxially around said axle, a plurality of ground working disks mounted on said tube, a cylindrical collar fixedly disposed on said axle beyond an end of said tube and having a diameter greater than the diameter of said tube, a first bracket fixedly mounted on an end of said tube, means cooperating with said bracket for clamping said disks on said tube, and a cup-shaped bearing bracket having a radially extending flange portion detachably secured to said first bracket and an axially extending bearing portion journaled on the cylindrical surface of said collar.

14. In a disk gang including a frame and an axle rigidly mounted thereon, the combination of a tube disposed coaxially around said axle, a plurality of ground working disks mounted on said tube, a cylindrical collar fixedly disposed on said axle beyond an end of said tube, a cup-shaped bearing bracket detachably fixed relative to said tube and having rotatable therewith, a cylindrical bearing portion journaled on said cylindrical collar and an end wall adjacent the outer end of said collar, and flexible annular sealing means disposed between said end wall and said collar to exclude dust and retain lubrication.

15. In a disk gang including a frame and an axle rigidly mounted thereon, the combination of a tube disposed coaxially around said axle, a plurality of ground working disks mounted on said tube, a cylindrical collar fixedly disposed on said axle beyond an end of said tube and having a diameter greater than the diameter of said tube, a first bracket fixedly mounted on an end of said tube, means cooperating with said bracket for clamping said disks on said tube, a cup-shaped bearing bracket having a radially extending flange portion detachably secured to said first bracket, an axially extending bearing portion journaled on the cylindrical surface of said collar, and an end wall adjacent the outer end of said collar and apertured to receive said axle, said collar being provided with an annular recess in the outer end thereof and flexible annular sealing means disposed in said recess in wiping contact with said end wall to exclude dust and retain lubrication.

16. In a disk gang including a frame and an axle rigidly mounted thereon, the combination of a bearing member mounted on said axle, a disk supporting tube assembly embracing said axle and journaled on said bearing member, a closure member fixed relative to the end of said tube, rotatable therewith and disposed outside said bearing member and embracing said axle, and resilient annular sealing means encircling said axle between adjacent portions of said members in sliding contact with one of said faces to form a lubricant retaining enclosure between said tube and said axle.

17. In a disk gang including a frame and an axle rigidly mounted thereon, the combination of a bearing member mounted on said axle, a disk supporting tube assembly embracing said axle and journaled on said bearing member, a closure member fixed relative to the end of said tube, rotatable therewith and disposed outside said bearing member and embracing said axle, said members having a pair of adjacent radial faces, one of said members having an annular recess in the radial face adjacent the other member, and resilient annular sealing means encircling said axle and disposed within said recess in sliding contact with the adjacent radial face of said other member to form a lubricant retaining enclosure between said tube and said axle.

18. In a disk gang including a frame and an axle rigidly mounted thereon, the combination of a bearing member rigidly mounted on said axle, a disk supporting tube assembly embracing said axle and journaled on said bearing member and including a member embracing said axle outside said bearing member and serving as a closure for said tube assembly, said bearing and closure members having a pair of adjacent radial faces, said bearing member having an annular recess in the radial face adjacent said closure member, and resilient annular sealing means encircling said axle and disposed within said recess in stationary relation to said bearing member and in sliding contact with the adjacent radial face of said closure member to form a lubricant retaining enclosure between said tube assembly and said axle.

19. In a disk gang including a frame and an axle rigidly mounted thereon, the combination of a bearing member rigidly mounted on said axle, a disk supporting tube assembly embracing said axle and journaled on said bearing member and including a member embracing said axle outside said bearing member and serving as a closure for said tube assembly, said bearing and closure members having a pair of adjacent radial faces, said bearing member having an annular recess in the radial face adjacent said closure member, and resilient annular sealing means snugly encircling said axle within said recess preventing leakage of lubricant between said axle and said bearing member and in sliding contact with the adjacent radial face of said closure member to prevent leakage of lubricant from the coacting bearing surfaces of said bearing member and said tube assembly.

20. In a disk gang including a frame and an axle rigidly mounted thereon, the combination of a bearing member rigidly mounted on said axle, a disk supporting tube assembly embracing said axle and journaled on said bearing member and including a tube, a disk supporting end bracket mounted on one end of said tube, and a cap detachably fixed to said end bracket and having a radially extending portion disposed outside of said bearing member and apertured to receive said axle, said bearing member having an annular recess in the end of the member adjacent said cap around said axle, and resilient annular sealing means disposed within said recess in contact with said axle to prevent influx of dust between said bearing member and said axle and disposed in sliding contact with the inner face of said radial cap portion to prevent influx of dust between said bearing member and said tube assembly.

ROLLIE H. MITCHELL.